Sept. 4, 1956  A. P. KRUEGER  2,761,503
MECHANISM FOR PROGRESSIVELY SEVERING TAPE
Filed Dec. 12, 1952  2 Sheets-Sheet 1

INVENTOR
Alfred P. Krueger
BY Rockwell Bartholow
ATTORNEYS

Sept. 4, 1956 A. P. KRUEGER 2,761,503
MECHANISM FOR PROGRESSIVELY SEVERING TAPE
Filed Dec. 12, 1952 2 Sheets-Sheet 2
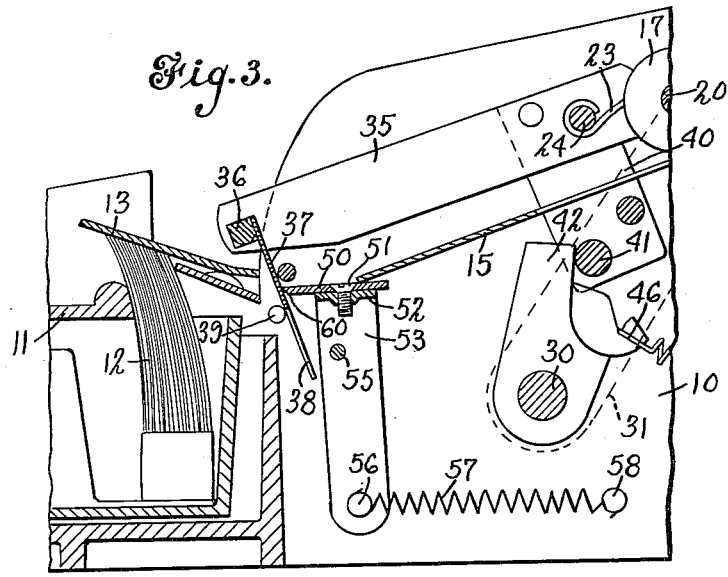
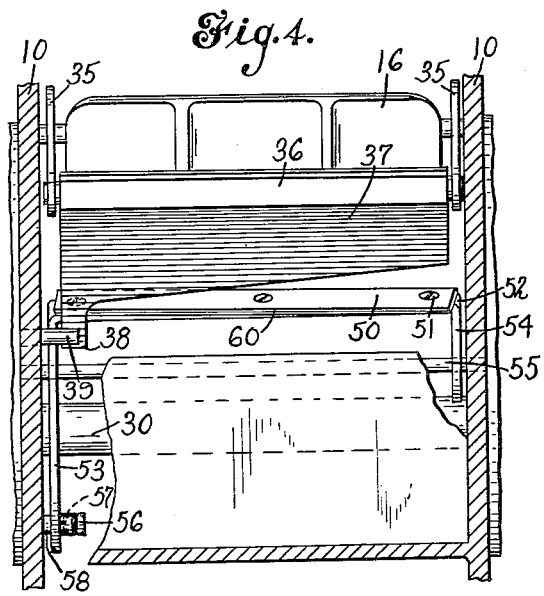
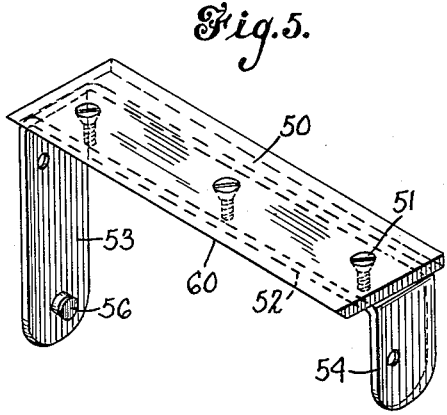
INVENTOR
Alfred P. Krueger
BY
Rockwell Bartholow
ATTORNEYS

United States Patent Office 2,761,503
Patented Sept. 4, 1956

2,761,503

MECHANISM FOR PROGRESSIVELY SEVERING TAPE

Alfred P. Krueger, Stratford, Conn., assignor to Derby Sealers, Incorporated, Derby, Conn., a corporation of Connecticut Application December 12, 1952, Serial No. 325,650

4 Claims. (Cl. 164—49)

This invention relates to tape-dispensing mechanisms, and more particularly to a severing or cutting mechanism for a machine which will deliver a strip of tape from a supply roll thereof. While the invention may be applied to a machine for dispensing any type of tape, it is described as applied to a machine for dispensing so-called gummed tape which is usually provided with a coating or gum upon one face which requires moistening before being applied to the surface to which it should adhere.

In tape-dispensing machines of the character illustrated, it is usual to provide a movable cutting or severing member or knife which operates in conjunction with a shear blade so that the tape will be severed cleanly. In some instances the tape is fed or dispensed over a table, and the movable cutting blade or knife is so arranged as to move downwardly over the edge of this table, the edge of the table acting as the cooperating shearing member. The plane of the movable knife is disposed substantially at right angles to that of the table, and it is desirable that the parts be so arranged that the knife in its descent be close to or in contact with the cooperating shearing edge of the table.

It has been found, however, that it is not always possible to secure the proper cooperative relationship in such a construction to make a clean cut and one which will not require too great an effort on the part of the operator of the machine. This is true notwithstanding the fact that in some instances the movable knife or cutter has been hinged to its support and urged toward the cooperating shear member. It is contemplated by the present invention to provide a cooperating cutting member and shear member so constructed that the severing of the tape will be effected progressively from one edge of the tape to the other in a direction transversely of the tape while at the same time the cooperating shearing and cutting members will always be in contact at the point where the cutting operation is being effected although out of contact over the greater part of the remainder of their adjacent surfaces. This is accomplished by providing a movable cutter having an edge in the direction of its plane, which in this case is generally vertical, so that it will contact the tape initially at one edge and progressively sever the same as it is moved downwardly, and providing a cooperating shearing member with an edge which is at an angle to the path of the movable blade, the edge of the shearing blade being at an angle to the path of the tape in a substantially horizontal plane.

Means are provided to hold the movable knife toward the edge of the cooperating shearing member, and the latter is mounted to swing or move rearwardly against spring tension so that as the movable knife descends it will, due to the angled edge of the shearing member, cam the latter rearwardly as the point of contact between the two travels transversely across the path of the tape from one edge to the other. With this construction it will be seen that the two cooperating shearing members are in contact only at one point at any given time which is the point at which the cutting action is taking place, and these members will be substantially out of contact except at this point. Thus it will be seen that a true shearing action will be effected, the shaping of the working edge of the cooperating shearing blade being equivalent to the "set" given the cooperating blades of a pair of scissors.

One object of the invention is to provide a tape-dispensing device having improved means for severing the dispensed tape.

A still further object of the invention is to provide a tape-dispensing mechanism having a pair of cooperating shearing members to sever the dispensed tape, one of these members being disposed in a plane substantially at right angles to the other, and the edge of one member being inclined relatively to the plane of the other.

A still further object of the invention is to provide a severing means for a tape-dispensing machine of the class described in which both of two cooperating severing members are mounted for movement, one being adapted to be moved by pressure of the other thereon during the severing operation, and said one member having a blade disposed at an angle to the adjacent surface of the other whereby the members are in contact only at the point at which the severing action occurs.

Still another object of the invention is to provide a cutting mechanism for a tape-dispensing machine, the mechanism comprising a substantially horizontally disposed shear member and a generally vertically disposed shear member, the latter being adapted to move across the edge of the former, and the former shear member being mounted for substantially horizontal movement toward and from the plane of the other member.

To these and other ends the invention consists in the novel features and combinations of parts to be hereinafter described and claimed.

In the accompanying drawings:

Fig. 3 is a view similar to Fig. 1 showing the severing mechanism in another position;

Fig. 4 is a sectional view on line 4—4 of Fig. 1; and

Fig. 5 is a detail perspective view of the shearing member.

Figure 1:
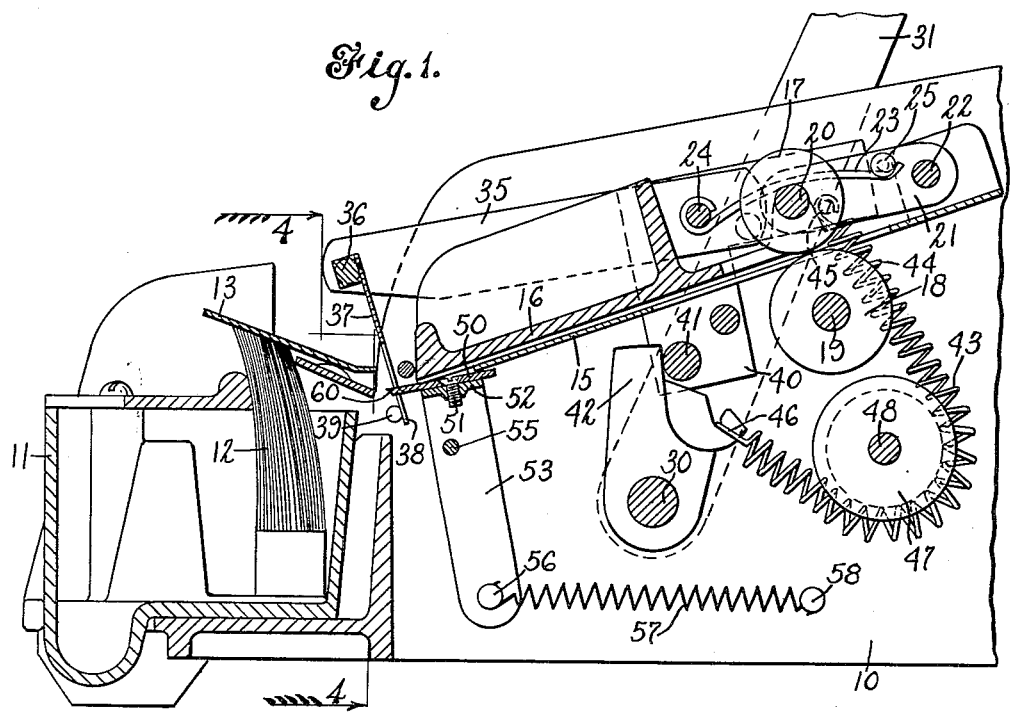
Fig 1 is a sectional view of the front portion of a tape-dispensing mechanism embodying my invention.

To illustrate a preferred embodiment of my invention I have shown a portion of a machine for dispensing gummed tape, the machine having a frame comprising a pair of side walls 10 which constitutes the supporting elements for the working parts of the mechanism. Adjacent the forward end of the frame is a receptacle 11 in which is mounted a brush 12 to moisten the gummed surface of the tape, and cooperating with this brush is a guide plate 13 to hold the tape against the upper edge of the brush.

Rearwardly of the receptacle and supported by the frame is a table 15 over which the tape is fed, and resting upon the table is a pressure plate 16 disposed above the upper surface of the tape.

The tape is designed to be fed forwardly through upper and lower feed rollers 17 and 18. The lower feed roll 18 is carried by a shaft 19 rotatably mounted in the side walls 10, while the upper feed roll 17 is rotatably mounted upon a shaft or rod 20.

The rod 20 is supported in arms 21 (Figs. 1 and 2), which arms are swingably mounted upon a rod 22 supported by the side walls of the frame and extending transversely across the frame. The upper roll 17 is yieldingly pressed downwardly upon the lower roll by means of springs 23, the intermediate portion of which engages the rod or shaft 20 and the ends of which are engaged respectively with a rod 24 supported by the side plates 10 and studs 25 carried by the arms 21 and extending inwardly therefrom. Thus it will be seen that the roller 17 is yieldably held in feeding relation against the roller 18 but is permitted to move upwardly against the tension of springs 23 to separate the rolls in order to allow the operator to introduce the tape between them.

Rotatably mounted in the side walls 10 of the frame 10 is a shaft 30 to which is secured at one side of the frame a handle lever 31 by which the feed roll is actuated. This shaft extends through the frame and is connected by suitable drive gearing designated generally by the numeral 32 with a pinion 33 on the shaft 19 of the driven feed roll 18. It will be understood that the above-described mechanism is of conventional form and similar to that shown in my prior Patent No. 2,365,477 granted December 19, 1944.

The severing mechanism comprises a knife or cutter frame consisting of a pair of arms 35 pivoted on the rod 24, one of the arms being located at each side of the machine adjacent one of the side walls 10. A knife bar 36 is loosely supported by these arms at their forward ends, the bar carrying the knife blade 37 which, while being generally vertically disposed, is inclined slightly downwardly and rearwardly, as shown in Figs. 1 and 3.

Figure 2:
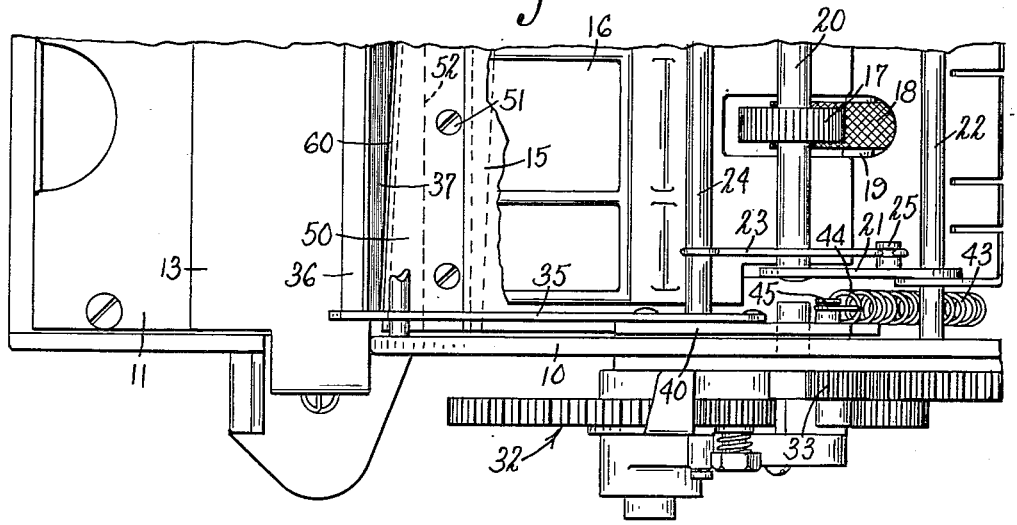
Fig. 2 is a partial plan view of the mechanism shown in Fig. 1.

As shown in Fig. 4, the lower edge of the knife is inclined at a vertical direction so that the blade is wider at one edge than at the other (the left-hand edge being the wider, as shown in Fig. 4, and at this edge of the blade is provided with a guide lug 38 which, as shown in Fig. 1, engages against a pin 39 to guide the knife in its movement during the operation of the machine. This pin prevents the knife from moving forwardly under pressure of its contact with the cooperating shear member to be described hereinafter.

Secured to each of the arms 35 is a depending plate 40 which plates are rigidly connected by transversely extending bars 41 to form a rigid frame. Secured to the shaft 30 are cutter-actuating cams or lugs 42, one adjacent each side wall, which are adapted, adjacent the end of the back stroke of the handle 31, to strike one of the bars 41 and swing the cutter frame about the rod 24 from the position shown in Fig. 1 to that shown in Fig. 3. It is during this movement of the knife that the tape is severed.

A pair of coil springs 43, one at each side of the device, are connected at one end 44 to a cutter frame member 45 and at the other end, as shown at 46, to one of the cams or lugs 42. The intermediate portion of each spring is passed about a sheave 47 loosely mounted upon a shaft 48. These springs serve the double purpose of maintaining the handle in its rearward position or in position to begin a feeding stroke and also maintaining the knife blade in its upper inoperative position shown in Fig. 1.

Mounted adjacent the forward end of the table 15 is the shear member 50 (Fig. 3) which cooperates with the movable cutting blade 37. This member 50 is secured by screws 51 to the bight portion 52 of a U-shaped supporting member, the legs 53 and 54 of which are pivoted upon a rod 55 extending between the side plates 10. It may be noted that the leg 53 extends downwardly below the pivot rod and carries adjacent its lower end a pin 56 to which is secured one end of a tension spring 57, the other end of the spring being secured to a pin 58 carried by one of the side plates 10. It may be noted that the spring 57 is tensioned to urge the lower end of the leg 53 of the knife-supporting member in a counterclockwise direction, as shown in Figs. 1 and 3, so as to urge the shear member 50 in a forward direction toward the blade 37. As shown more especially in Figs. 1, 4 and 5 of the drawing, the forward edge 60 of the shear member 50 is inclined at an angle to the axis of the machine or to a line extending transversely across the path of the tape. As shown in Figs. 4 and 5, for example, the shearing member is wider at its right-hand end than at its left so that its left-hand edge stands in a position rearwardly of the right-hand edge with respect to a transverse line or plane through the machine.

The spring 57 maintains the left-hand edge (Fig. 4) of the shear member 50 against the guide lug 38 of the cutting blade 37 so that the two members are in contact at this point when the device is at rest, as shown. Also as shown in Fig. 1, the right-hand end of the shear member 50 stands slightly forwardly of the plane of the cutting blade 37, but as the edge of the latter is inclined vertically, it will stand above the shear member 50 at this point.

When the machine is at rest, the parts are in the position shown in Fig. 1. The handle 31 may be drawn forward to dispense a length of tape from the machine between the upper surface of the shear member 50 and the lower edge of the cutting blade 37 and past the moistening brush 12. During this movement the spring 43 is tensioned and maintains the cutting blade 37 in its upper position as the connection of the spring with the cutter frame is rearwardly of the pivot 24 of this frame. When the handle is released, this spring 43 returns it to its rearward position, and at the end of the rearward movement the lug 42 strikes the rod 41, as shown in Fig. 3, and moves the cutter blade downwardly against the tension of spring 43 to effect a severing operation.

It will be noted that during the severing operation the cutting blade 37 contacts the edge of the shear member 50 progressively across its edge as the cutting blade 37 moves downwardly. This results both from the vertically inclined or angled lower edge of the blade 37 and the horizontally angled forward edge of the shear member 50. As shown in Fig. 4, the contact is first made at the left-hand side of the machine and gradually moves during the descent of the blade toward the right-hand end of the machine. As the right-hand end of the shear member 50 stands forwardly of the left-hand end, the shear member will be gradually moved in a rearward direction about the pivot rod 55 as the cutting blade travels downwardly. The spring 57 at all times holds the shear member 50 against the blade 37, the forward movement of this member being limited by the guide pin 39 so that a clean cut is effected progressively across the width of the tape. The effort required for the severing operation will be evenly divided over the width of the tape and will not be excessive at any one time.

It will be understood that, as shown in my Patent No. 2,365,477 above referred to, there may be a lost-motion connection between the arm 31 and the tape-feeding mechanism at the rear end of the stroke so that the arm may be drawn forwardly a slight distance from the position shown in Fig. 3 so as to raise the knife 37 from the path of the tape before the feeding operation begins.

While I have shown and described a preferred embodiment of my invention, it will be understood that it is not to be limited to all of the details shown, but is capable of modification and variation within the spirit of the invention and within the scope of the claims.

What I claim is:

1. A tape-dispensing machine comprising a frame, tape-feeding and tape-cutting mechanism mounted thereon, said cutting mechanism comprising a retractable shearing element over which the tape is fed, a movably mounted cutting element having its cutting edge inclined in the plane of its movement, means for moving the latter across the edge of the shearing element to sever the tape, and said edge of the shearing element being inclined relatively to the path of the cutting element in a direction transversely to that of the path of the tape whereby the shearing element is progressively retracted by the movement of the cutting element, means mounting said shearing element for bodily movement toward and from the path of the cutting element, and spring means urging the shearing element toward the cutting element.

2. A tape-dispensing machine comprising a frame, tape-feeding and tape-cutting mechanism mounted thereon, said cutting mechanism comprising a retractable shearing element over which the tape is fed, a movably mounted cutting element having its cutting edge inclined in the plane of its movement, means for moving the latter across the edge of the shearing element to sever the tape, and said edge of the shearing element being inclined relatively to the path of the cutting element in a direction transversely to that of the path of the tape whereby the shearing element is progressively retracted by the movement of the cutting element, spaced parallel arms upon which the shearing element is mounted and means pivoting said arms to the frame to permit movement of the shearing element toward and from the cutting element.

3. A tape-dispensing machine comprising a frame, tape-feeding and tape-cutting mechanism mounted thereon, said cutting mechanism comprising a retractable shearing element over which the tape is fed, a movably mounted cutting element having its cutting edge inclined in the plane of its movement, means for moving the latter across the edge of the shearing element to sever the tape, and said edge of the shearing element being inclined relatively to the path of the cutting element in a direction transversely to that of the path of the tape whereby the shearing element is progressively retracted by the movement of the cutting element, a substantially U-shaped supporting member upon the bight portion of which the shearing element is mounted, and means pivoting said member to the frame upon an axis spaced from the shearing member to permit movement of the latter toward and from the cutting member.

4. A tape-dispensing machine comprising a frame, tape-feeding and tape-cutting mechanism mounted thereon, said cutting mechanism comprising a retractable shearing element over which the tape is fed, a movably mounted cutting element having its cutting edge inclined in the plane of its movement, means for moving the latter across the edge of the shearing element to sever the tape, and said edge of the shearing element being inclined relatively to the path of the cutting element in a direction transversely to that of the path of the tape whereby the shearing element is progressively retracted by the movement of the cutting element, a substantially U-shaped supporting member upon the bight portion of which the shearing element is mounted, means pivoting said member to the frame upon an axis spaced from the shearing member to permit movement of the latter toward and from the cutting member, and a spring connected to said supporting member to urge the shearing member toward the cutting member.

References Cited in the file of this patent

UNITED STATES PATENTS

| Number | Name | Date |
|---|---|---|
| 635,457 | Yandall | Oct. 24, 1899 |
| 1,416,800 | Detjen | May 23, 1922 |
| 1,731,413 | Glasser | Oct. 15, 1929 |
| 1,787,657 | Andren et al. | Jan. 6, 1931 |
| 1,874,816 | Shipley | Aug. 30, 1932 |
| 2,180,903 | Jensen | Nov. 21, 1939 |
| 2,192,132 | Gautier | Feb. 27, 1940 |
| 2,365,477 | Krueger | Dec. 19, 1944 |

FOREIGN PATENTS

| 529,490 | France | Sept. 10, 1921 |